(12) United States Patent  
Ashton

(10) Patent No.: US 10,694,894 B1  
(45) Date of Patent: Jun. 30, 2020

(54) HERB GRINDER

(71) Applicant: Jason Ashton, Aptos, CA (US)

(72) Inventor: Jason Ashton, Aptos, CA (US)

(*) Notice: Subject to any disclaimer, the term of this patent is extended or adjusted under 35 U.S.C. 154(b) by 0 days.

(21) Appl. No.: 16/277,500

(22) Filed: Feb. 15, 2019

Related U.S. Application Data

(60) Provisional application No. 62/778,594, filed on Dec. 12, 2018.

(51) Int. Cl.
*A47J 42/34* (2006.01)
*A47J 42/40* (2006.01)
*A47J 42/14* (2006.01)
*A47J 42/36* (2006.01)

(52) U.S. Cl.
CPC ............ *A47J 42/34* (2013.01); *A47J 42/14* (2013.01); *A47J 42/36* (2013.01); *A47J 42/40* (2013.01)

(58) Field of Classification Search
CPC .. A47J 42/34; A47J 42/36; A47J 42/14; A47J 42/40
USPC ............................................. 241/168, 169.1
See application file for complete search history.

(56) References Cited

U.S. PATENT DOCUMENTS

| | | | | |
|---|---|---|---|---|
| 267,535 A | * | 11/1882 | Hurd | A47J 37/0611 99/372 |
| 7,367,519 B2 | * | 5/2008 | de Groote | A47J 19/04 241/169.1 |
| 7,422,170 B2 | * | 9/2008 | Bao | B02C 18/24 241/168 |
| 7,886,999 B2 | * | 2/2011 | Ruzycky | A47J 42/24 241/168 |
| D635,413 S | * | 4/2011 | Griffin | D7/693 |
| 8,083,167 B1 | * | 12/2011 | Namakian | A47J 42/24 241/169.1 |
| 8,220,732 B2 | * | 7/2012 | Griffin | A47J 43/04 241/169.1 |
| 8,695,906 B2 | * | 4/2014 | Hainbach | A47J 42/14 241/169.1 |
| 8,733,679 B2 | * | 5/2014 | Camitta | B02C 18/16 241/169.1 |
| 9,241,597 B2 | * | 1/2016 | Dukat | A47J 42/14 |
| 9,427,020 B2 | * | 8/2016 | Ruzycky | A24C 5/02 |
| 9,510,709 B2 | * | 12/2016 | Wilson | A47J 42/14 |
| 9,730,554 B2 | * | 8/2017 | Chan | A47J 42/34 |
| 9,873,125 B1 | * | 1/2018 | LaGuardia, Jr. | A24F 13/24 |
| 10,039,418 B2 | * | 8/2018 | Staiano | B02C 23/10 |
| 10,492,524 B2 | * | 12/2019 | Ruzycky | A24C 5/42 |
| 2007/0262182 A1 | * | 11/2007 | de Groote | A47J 19/04 241/169.1 |

(Continued)

*Primary Examiner* — Faye Francis  
(74) *Attorney, Agent, or Firm* — Donald R. Boys; Cantral Coast Patent Agency LLC

(57) ABSTRACT

A herb processor has an upper cutting element having a descending cylindrical body with blades extending downward from an upper base disk in a first pattern, and a region of a specific geometry devoid of blades, a lower cutting element having an ascending cylindrical body having a central axis, an outer and an inner diameter, blades extending upward from a lower base disk in a second pattern, a region of specific geometry devoid of blades, openings through the lower base disk in a third pattern, and a lower engagement interface, and a cylindrical collection chamber having a lower closed end and an upper engagement interface. The regions devoid of blades provide a crush-free zone.

9 Claims, 14 Drawing Sheets

(56) References Cited

U.S. PATENT DOCUMENTS

| | | | |
|---|---|---|---|
| 2012/0097774 A1* | 4/2012 | Hainbach | A47J 42/14 |
| | | | 241/101.2 |
| 2014/0217213 A1* | 8/2014 | Edwards | A47J 42/40 |
| | | | 241/69 |
| 2016/0106262 A1* | 4/2016 | Mroue | A47J 42/26 |
| | | | 241/79 |
| 2016/0128513 A1* | 5/2016 | Chan | A47J 42/34 |
| | | | 241/28 |
| 2017/0319009 A1* | 11/2017 | Seckel | A47J 42/34 |
| 2018/0168398 A1* | 6/2018 | Wang | A47J 42/34 |
| 2018/0271328 A1* | 9/2018 | Petrossian | A47J 42/38 |
| 2018/0338642 A1* | 11/2018 | Staiano | B02C 23/10 |
| 2019/0000140 A1* | 1/2019 | Manning | A24F 19/10 |
| 2019/0150666 A1* | 5/2019 | Wozniak | A24F 47/00 |
| 2019/0269277 A1* | 9/2019 | Larose | A47J 42/34 |
| 2019/0269278 A1* | 9/2019 | Neury | A47J 42/34 |

* cited by examiner

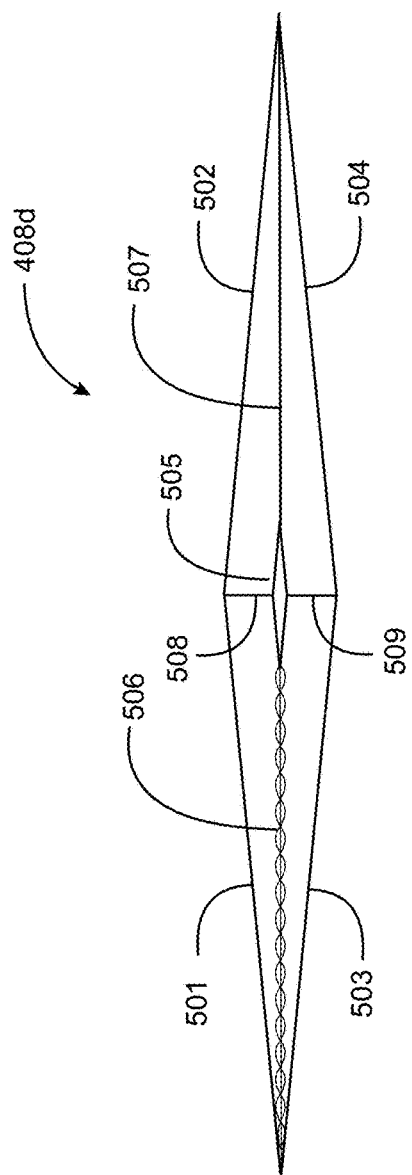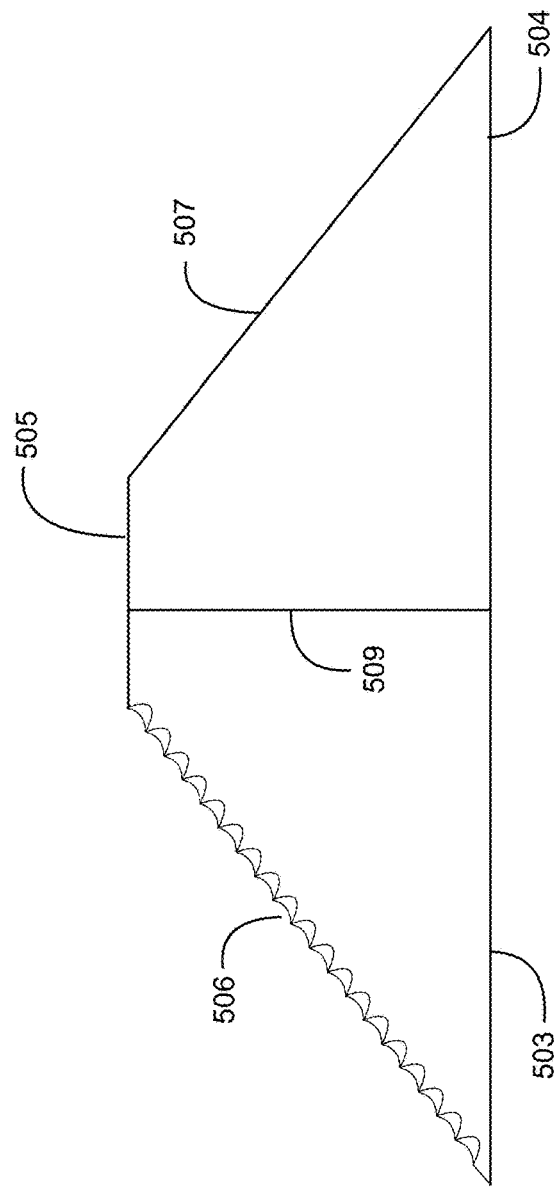
Fig. 5B
Fig. 5C

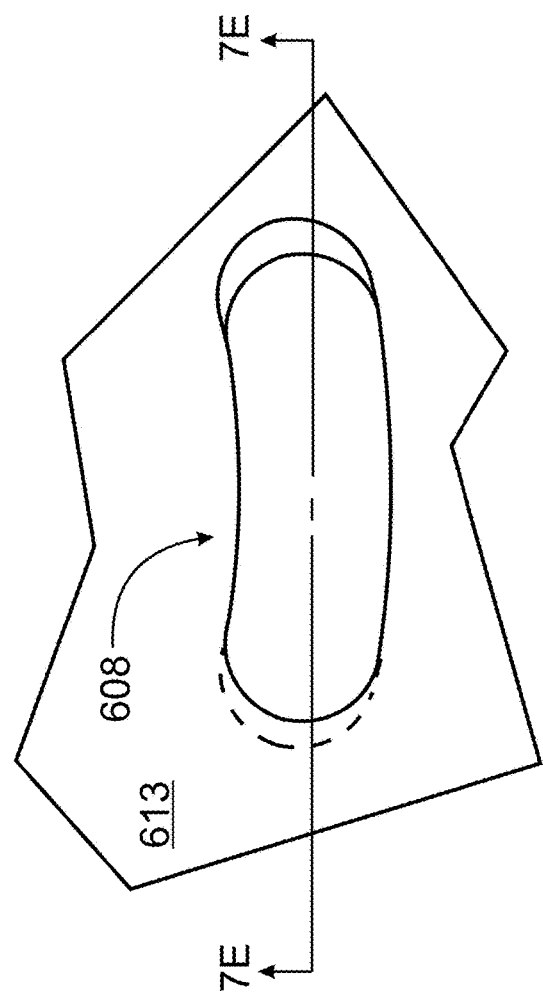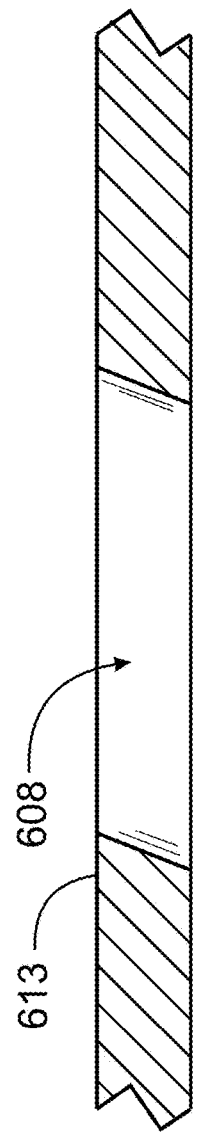
Fig. 7D
Fig. 7E

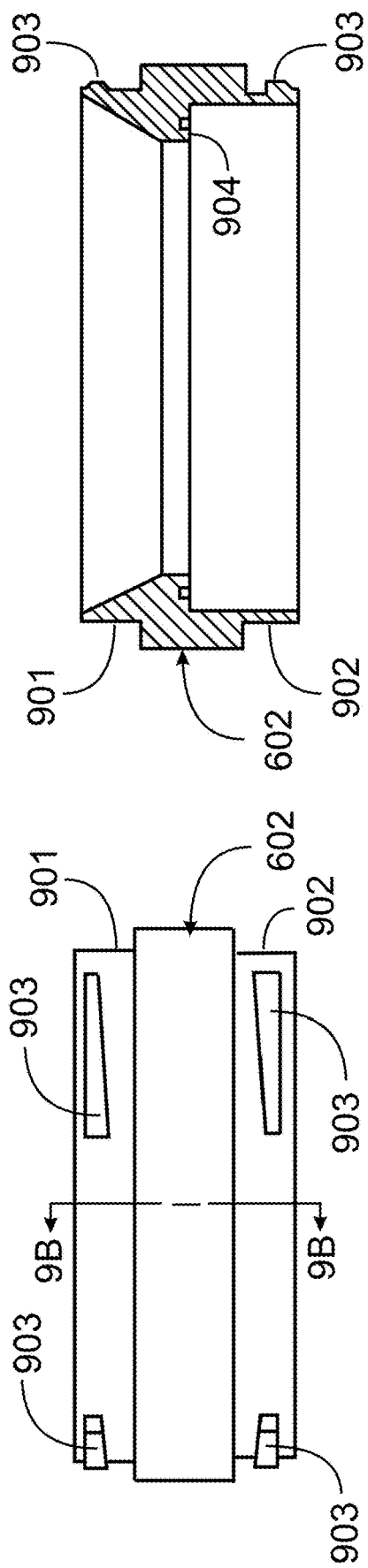

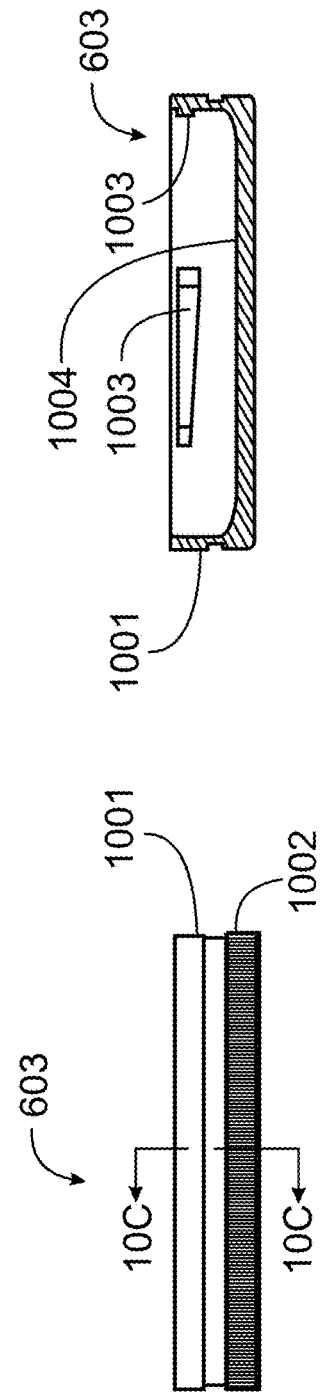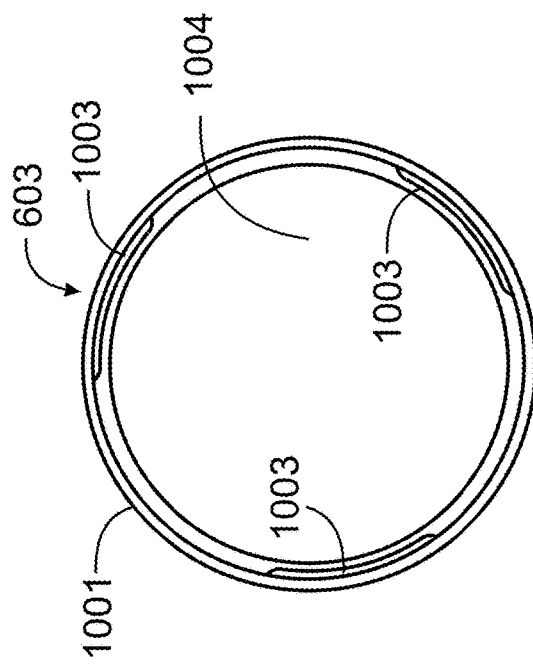

HERB GRINDER

CROSS-REFERENCE TO RELATED DOCUMENTS

The present invention claims priority to provisional patent application 62/778,594 filed Dec. 12, 2018, and all disclosure of the parent case is incorporated at least by reference.

BACKGROUND OF THE INVENTION

1. Field of the Invention

The present invention is in the technical area of grinding apparatus and methods for grinding aromatic herbs and pertains more particularly to hand-held and manually operated apparatus.

2. Description of Related Art

There exists a relatively rich body of issued United States patents and published patent applications in the technical area of grinding such as tobacco and other aromatic herbs. The present applicant has provided with this patent application an Information Disclosure Statement (IDS) listing a number of US patents and published patent applications that teach apparatus and methods in the area of the technology of the present application. This list may not be all such applications and patents but may list most such applications and patents. This specification refers to figures and description of individual ones of these published documents, all of which may be considered to predate the filing of the instant application.

Most grinders of the hand-held and manually operated sort have many features in common, such as opposing rotating elements with blades that fit together in a way to provide a shredding process, a catching basin, and in many such devices a screen separating finely ground product from more coarsely ground material. The known prior art provides a variety of differences meant to provide specific functionality, but the present inventor is of the opinion that much improvement may be made, which is a purpose of the present patent application.

BRIEF SUMMARY OF THE INVENTION

In one embodiment of the invention a herb processor is provided, comprising an upper cutting element having a descending cylindrical body having a central axis, an outer and an inner diameter, a planar lower end, blades extending downward from an upper base disk in a first pattern, and a region of a specific geometry devoid of blades, a lower cutting element having an ascending cylindrical body having a central axis, an outer and an inner diameter, blades extending upward from a lower base disk in a second pattern, a region of specific geometry devoid of blades, openings through the lower base disk in a third pattern, and a lower engagement interface of an outer diameter greater than the outer diameter of the ascending cylindrical body, presenting a planar shoulder at a lower end of the ascending cylindrical body, and a cylindrical collection chamber having a lower closed end and an upper engagement interface. The upper cutting element engages the lower cutting element with the inner diameter of the upper cutting element fitting over the outer diameter of the ascending cylindrical body of the lower cutting element, with the planar lower end of the upper cutting element meeting the planar shoulder at the lower end of the ascending cylindrical body, wherein the cylindrical collection chamber assembles to the lower cutting element by the upper engagement interface, engaging the lower engagement interface of the lower cutting element, and wherein the first and second pattern of blades are adapted to enable blades of the upper cutting element to pass blades of the lower cutting element as the upper and lower cutting elements are rotated relative to one another, without interference.

In one embodiment the blades of each of the upper and the lower cutting elements are shaped as flattened, truncated pyramids extending from the base of the pyramid, each blade positioned along a radius of the disk from which it extends, presenting a leading and a trailing cutting edge. Also, in one embodiment, the blades are positioned in each of the upper and the lower cutting elements along semicircular arcs beginning and ending at a specific diameter line dividing the base disks of the upper and lower cutting elements into two semicircular portions, one with blades and the other without blades. In one embodiment the upper cutting element has seven blades equally spaced along a first outer semicircular arc at a first radius, five blades equally spaced along a second intermediate semicircular arc at a second radius smaller than the first radius, and three blades equally spaced along a third semicircular arc at a third radius smaller than the second radius. And in one embodiment the lower cutting element has seven blades equally spaced along a semicircular arc at a fourth radius smaller than the first radius but greater than the second radius, and five blades equally spaced along a semicircular arc at a fifth radius smaller than the second radius by greater than the third radius.

In one embodiment the pattern of opening through the lower base disk comprises openings equally spaced in a circular pattern having a sixth radius greater than the fourth radius, openings equally spaced in a circular pattern at a seventh radius smaller than the fourth radius but greater than the fifth radius, and openings at an eighth radius smaller than the fifth radius. Also, in one embodiment, the openings through the lower base disk are arcuate openings having rounded ends and a width in the radial direction less than the difference between blades at the fourth radius and blades at the fifth radius. Also, in one embodiment individual ones of openings through the lower base disk have grater details at one or both ends of the opening, comprising regions adjacent edges of the opening at the ends, and raised above the floor, having sharp, machined edges. In one embodiment the herb processor comprises a positioning mechanism restricting initial engagement of the upper and the lower cutting elements to a rotational relationship whereby the regions devoid of blades in the upper and lower cutting elements must be overlaid to engage the cutting elements. And in one embodiment the positioning mechanism comprises a circumferential groove on the inside diameter of the upper cutting element near the planar lower end of the descending cylindrical body, with diametrically opposed openings into the groove from the planar lower end, and extended key elements on the outside diameter of the ascending cylindrical body near the planar shoulder at the lower end, whereby the extended key elements engage and enter the openings into the circumferential groove, positioning the regions devoid of blades proximate at assembly, providing a crush-free zone for loading material.

In one embodiment height of the ascending and descending cylindrical bodies with the cutting elements fully engaged provides an enclosed volume of a diameter and a height is at least 36 mm. Also, in one embodiment the processor further comprises an open-ended collection chamber having an identical engagement interface extending from each open end, the open-ended collection chamber engaged by one of the identical engagement interfaces to the lower engagement interface of the lower cutting element, with the a cylindrical closed-end collection chamber having a lower closed end engaged to the other identical engagement interfaces of the open-ended collection chamber, such that processed material passing through the openings in the base disk of the lower cutting element pass through the open-ended collection chamber and are collected by the cylindrical closed-end collection chamber. Also, in one embodiment a fine-mesh screen is imposed in the open-ended collection chamber such that processed material is retained on the screen in the open-ended collection chamber, but pollen dust passes through the screen to be collected by the closed-end collection chamber. And in one embodiment the engagement elements comprise arcuate inclined planes implemented on inner or outer walls of cylindrical elements, such that one engagement interface engages to another by engagement of the inclined planes.

In another aspect of the invention a herb processor is provided, comprising an upper cutting element having a descending cylindrical body having a central axis, an outer and an inner diameter, and blades extending downward from an upper base disk in a first pattern, a lower cutting element having an ascending cylindrical body having a central axis, an outer and an inner diameter, blades extending upward from a lower base disk in a second pattern, openings through the lower base disk in a third pattern, and a lower engagement interface of an outer diameter greater than the outer diameter of the ascending cylindrical body, and a cylindrical collection chamber having a lower closed end and an upper engagement interface. Individual ones of the blades extending from the upper or the lower base disk vary in dimension from the base disk to a tip of the blade. In one embodiment variance in dimension occurs in steps from one blade to adjacent blades.

In another aspect of the invention a herb processor is provided, comprising an upper cutting element having a descending cylindrical body having a central axis, an outer and an inner diameter, and blades extending downward from an upper base disk in a first pattern, a lower cutting element having an ascending cylindrical body having a central axis, an outer and an inner diameter, blades extending upward from a lower base disk in a second pattern, openings through the lower base disk in a third pattern, and a lower engagement interface of an outer diameter greater than the outer diameter of the ascending cylindrical body, and a cylindrical collection chamber having a lower closed end and an upper engagement interface. The blades of each of the upper and the lower cutting elements are shaped as flattened, truncated pyramids extending from the base of the pyramid, each blade positioned along a radius of the disk from which it extends, presenting a leading and a trailing cutting edge, and wherein individual ones of the blades are positioned such that a line in the base from leading to trailing edge is tangential to the radius, and individual ones of the blades are positioned such that the line in the base from leading to trailing edge deviates from tangential.

In yet another aspect of the invention a herb processor is provided, comprising an upper cutting element having a descending cylindrical body having a central axis, an outer and an inner diameter, and blades extending downward from an upper base disk in a first pattern, a lower cutting element having an ascending cylindrical body having a central axis, an outer and an inner diameter, blades extending upward from a lower base disk in a second pattern, openings through the lower base disk in a third pattern, and a lower engagement interface of an outer diameter greater than the outer diameter of the ascending cylindrical body, and a cylindrical collection chamber having a lower closed end and an upper engagement interface. Individual ones of the openings comprise raised, sharp grater elements implemented along one or more edges of the openings.

In yet another aspect of the invention a herb processor is provided, comprising an upper cutting element having a descending cylindrical body having a central axis, an outer and an inner diameter, and blades extending downward from an upper base disk in a first pattern, a lower cutting element having an ascending cylindrical body having a central axis, an outer and an inner diameter, blades extending upward from a lower base disk in a second pattern, openings through the lower base disk in a third pattern, and a lower engagement interface of an outer diameter greater than the outer diameter of the ascending cylindrical body, and a cylindrical collection chamber having a lower closed end and an upper engagement interface. The blades of each of the upper and the lower cutting elements are shaped as flattened, truncated pyramids extending from the base of the pyramid, presenting a leading and a trailing cutting edge, and wherein one or both of the leading or trailing cutting edge of individual ones of the blades are serrated. In another embodiment the cutting edges may be of different treatment.

In yet another aspect of the invention a herb processor is provided, comprising an upper cutting element having a descending cylindrical body having a central axis, an outer and an inner diameter, a planar lower end, and blades extending downward from an upper base disk in a first pattern, a lower cutting element having an ascending cylindrical body having a central axis, an outer and an inner diameter, blades extending upward from a lower base disk in a second pattern, openings through the lower base disk in a third pattern, and a first, lower engagement interface, the lower cutting element assembled to the upper cutting element, an open-ended first collection chamber having an identical second engagement interface extending from each open end, assembled to the lower cutting element by one of the identical engagement interfaces, at the first, lower engagement interface, and a second collection chamber having a lower closed end and a third engagement interface assembled to the open-ended first collection chamber. In the assembly of the upper cutting element, the lower cutting element, the open-ended collection chamber, and the second collection chamber, the open-ended collection chamber may be assembled in either direction, by virtue of the identical engagement interfaces on opposite ends.

BRIEF DESCRIPTION OF THE SEVERAL VIEWS OF THE DRAWINGS

FIG. 5B is a top plan view of an exemplary blade in an embodiment of the invention with a serrated cutting edge.

FIG. 5C is a side elevation view of the exemplary blade of FIG. 5B.

FIG. 7D is a plan view of an opening illustrating a slanted passage in an embodiment of the present invention.

FIG. 7E is a side elevation view of the opening of FIG. 7D taken along section line 7E-7E of FIG. 7D.

FIG. 9A is an elevation view of a catching chamber disengaged from other elements in an embodiment of the invention.

FIG. 9B is a section view of the catching chamber of FIG. 9A taken along section line 9B-9B.

FIG. 10A is an elevation view of the lower catching chamber of FIG. 6, disengaged from other elements in an embodiment of the invention.

FIG. 10B is a plan view directed into an open end of the lower catching chamber of FIG. 10A.

FIG. 10C is a section view of the lower catching chamber of FIGS. 10A and 10B taken along section line 10C-10C of FIG. 10A.

DETAILED DESCRIPTION OF THE INVENTION

Figure 1:
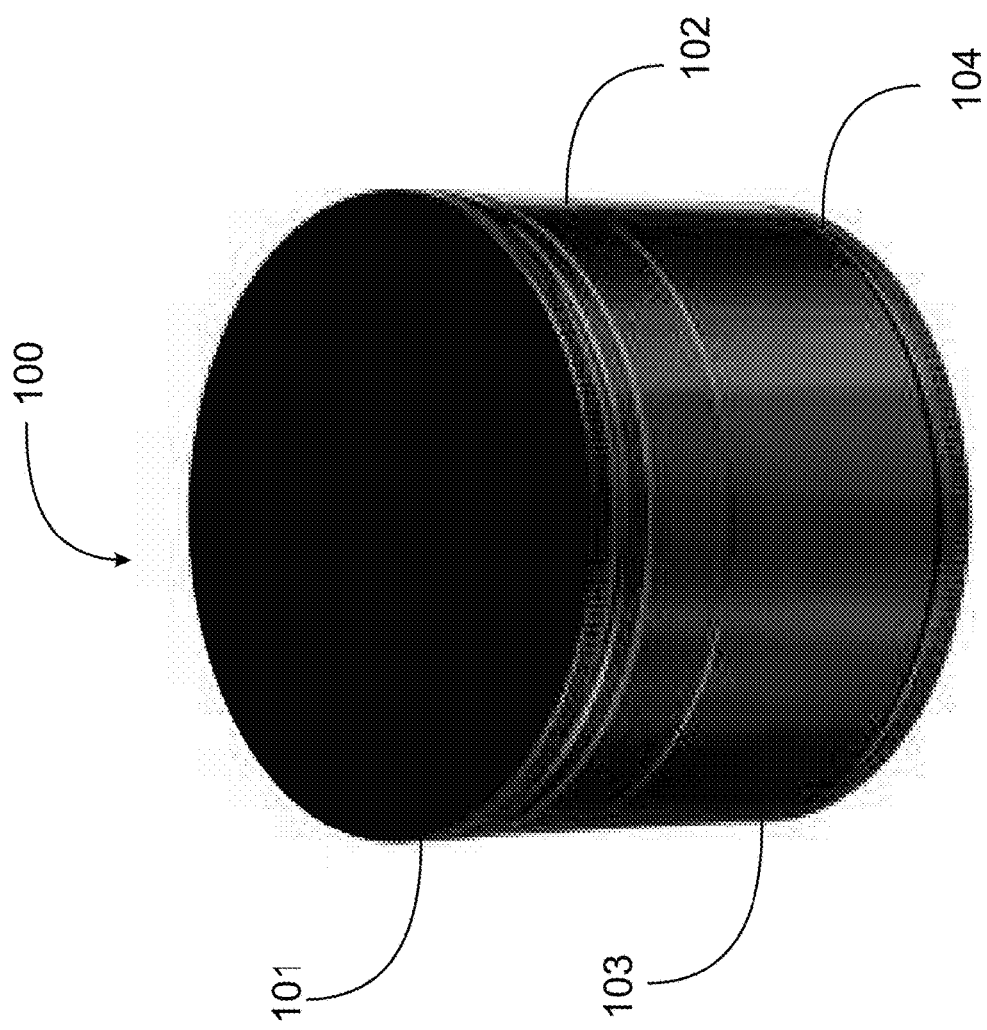
FIG. 1 is a perspective view of a herb grinder in the prior art.

FIG. 1 is a perspective view of a herb grinder 100 in the prior art, manufactured and marketed by an enterprise on the West Coast. Grinder 100 has 4 main parts. An upper grinder element 101 having downward-facing teeth (not shown in FIG. 1) engages a lower grinder element 102 having upward-facing teeth (also not shown in FIG. 1). Lower grinder element 102 engages a catching chamber 103 with a purpose of catching and holding ground or shredded material. In some embodiments catcher chamber 103 has an internal fine screen (not shown) that allows very fine material to pass through into a lower catcher chamber 104, while holding less finely shredded material on the screen.

Figure 2:
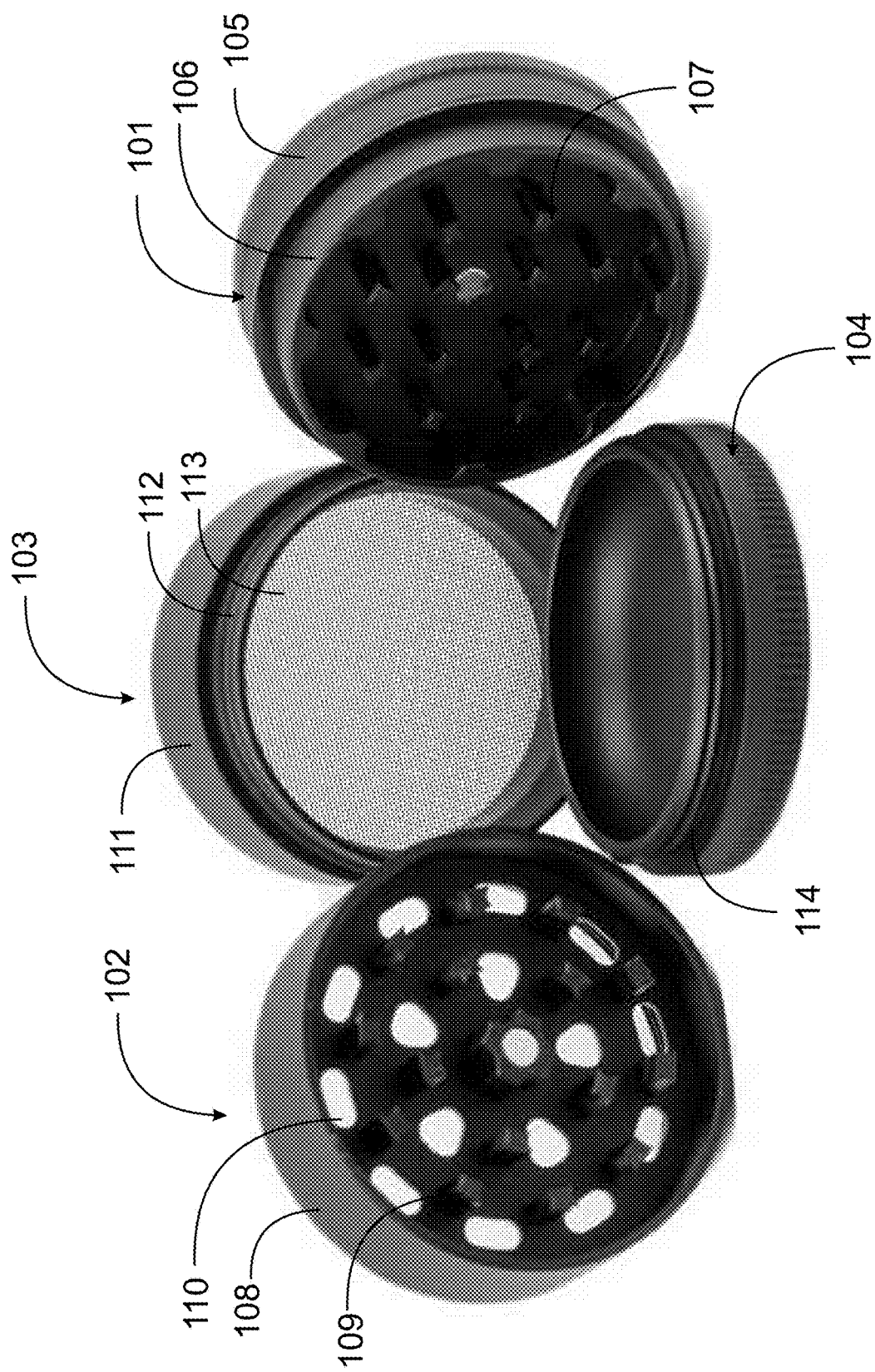
FIG. 2 is a perspective exploded view of the herb grinder of FIG. 1.

FIG. 2 is an exploded view of herb grinder 100 showing elements not seen in FIG. 1. Upper grinder element 101 has a body 105 at a larger diameter than a descending cylindrical ring 106. Teeth 107 extend downward in a specific pattern from a horizontal top disk. Lower grinder element 102 has a body 108 and upwardly-extending teeth 109 from a bottom disk which has through-openings 110.

In assembly as seen in FIG. 1, descending cylindrical ring 106, which has an outer diameter just slightly less than an inner diameter of upwardly-extending cylindrical body 108, fits into the inner diameter of body 108 up to a lip formed between body 105 and descending cylindrical ring 106. When engaged the teeth of upper grinder element 101 fit between the teeth of lower grinder element 102, as the teeth are positioned and spaced in the two elements to accomplish this purpose. Relative rotation between elements 101 and 102 cause relative rotation between the sets of teeth to accomplish a grinding effect on material smashed between tightly-grouped elements 101 and 102. In some apparatus magnets may be used to keep the elements in contact and engagement, without preventing the relative rotation necessary to grind material placed in the apparatus.

Catcher element 103 has a cylindrical body and is occluded by a fine-meshed screen 113 in horizontal aspect, such that material passing through openings 110 in the lower disk of lower grinder element 102, having been shredded, will collect in catcher element 103 on the screen, which will allow very fine material to pass through to be caught in lower catcher chamber 104.

Referring again to FIG. 2, lower grinder element 102 has female threads on a lowermost extension, not seen in FIG. 2, which in assembly engage male threads 112 at an uppermost extension of catcher element 103, such that the two may be joined, such that ground material from the volume between upper grinder element 101 and lower grinder element 102 may pass through openings 110 and fall into catcher chamber 103. Lower catcher chamber 104 and catcher chamber 103 join by threads formed on an upper region of the lower catcher chamber and a lower region of the catcher chamber.

Upper grinder elements constrained to rotate relative to lower grinder elements joined to a catcher container are common to most herb grinder apparatus known in the prior art.

Figure 3:
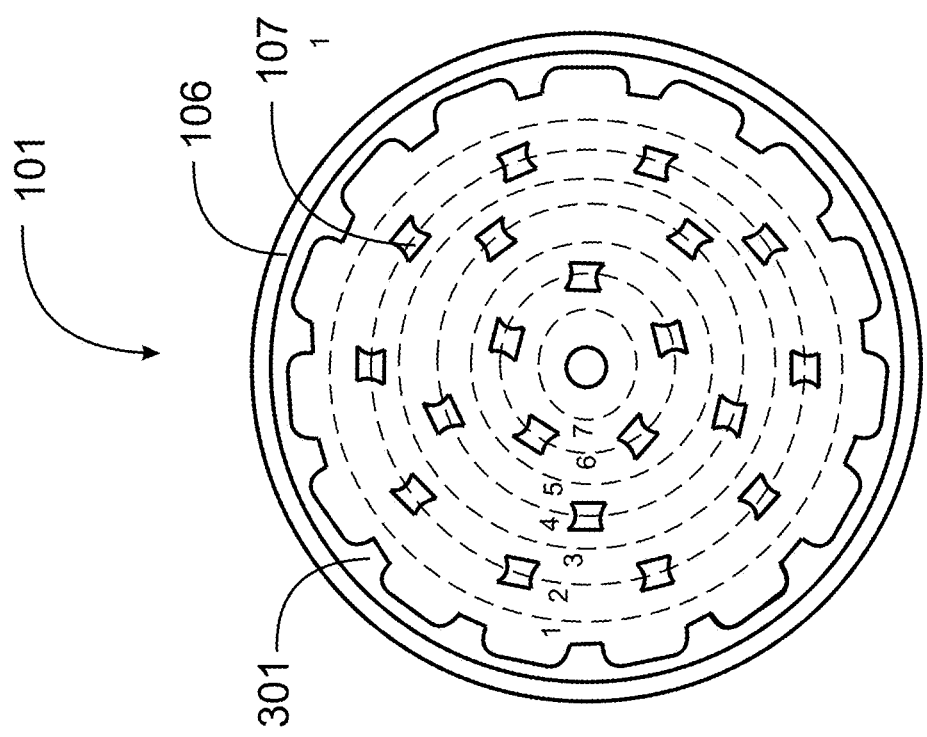
FIG. 3 is a plan view of an upper grinder element in the prior art.

FIG. 3 is a plan view of upper grinder element 101 in an example of the prior art, looking into the open end. Teeth 107 are seen in the direction of the vertical axis of the teeth. The inside diameter of descending cylindrical ring 106 is made with a series of extensions 301 spaced evenly around the circumference, which provide a mixing action to shredded material in operation in an assembled grinder. Teeth 107 in this example are evenly spaced along a circumference at three different radii with ten teeth at an outer radius marked "2". There are five teeth at a smaller radius marked "4", and five more at a yet smaller radius marked "6". There are twenty teeth in all in this example.

Three additional radii labeled "1", "3" and "5" are spaced between the radii of the radii "2", "4" and "6". The spacing is such that teeth extending from a base disk in lower grinder element 102, when the grinder elements are engaged, may occupy space along the even-numbered radii, such that relative rotation between the grinder elements will cause teeth in one element to pass close to, and in some cases between, the teeth of the other element. This passage of teeth provides the grinding or grinder action desired. It may be noted that the shapes of the teeth in these examples of the prior art contribute to crushing of material in loading the material prior to grinding, and further crushing of material is grinding is implemented.

Figure 4:
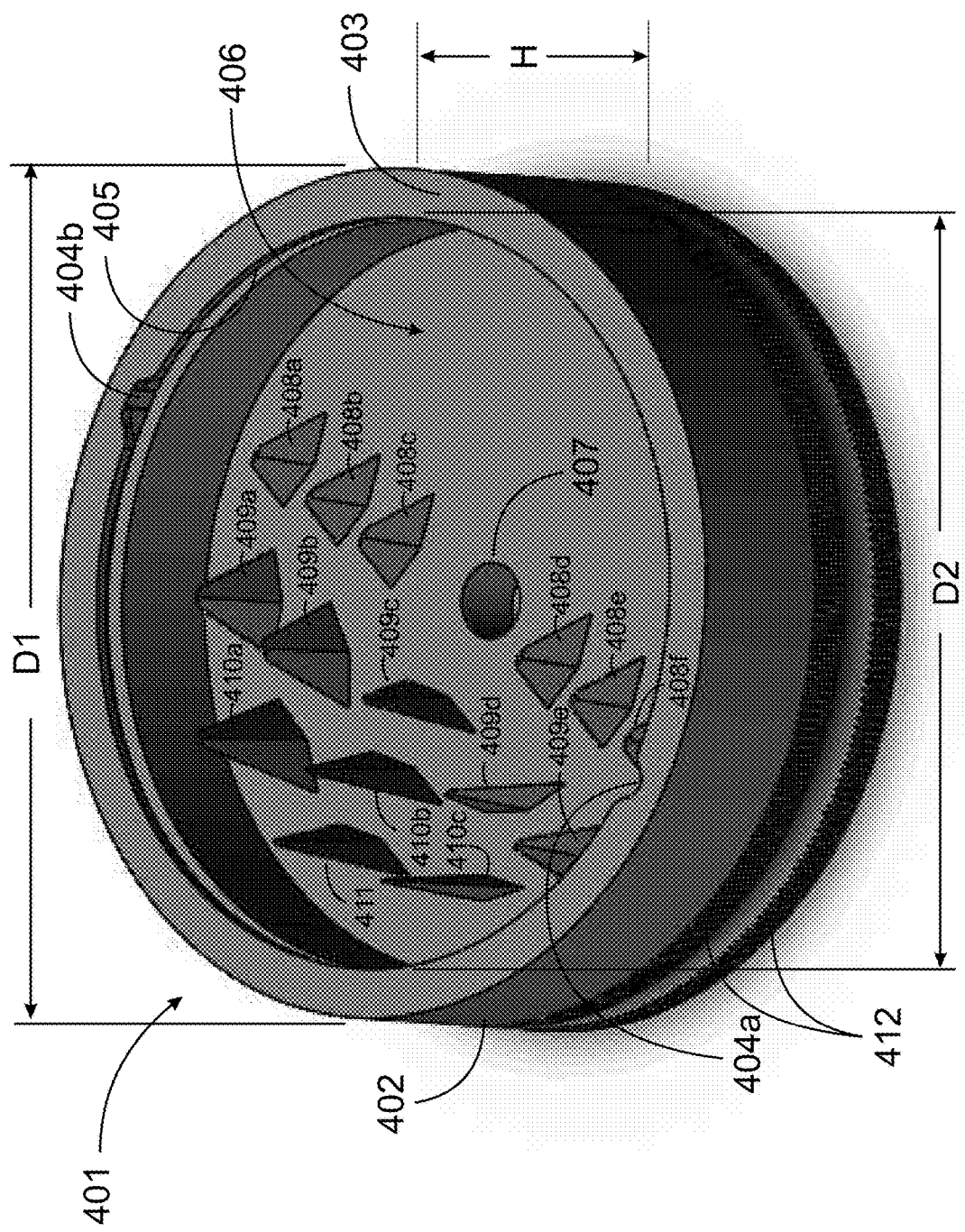
FIG. 4 is a perspective view of an upper cutting element in an embodiment of the present invention.

FIG. 4 is a perspective view of an upper cutting element 401 in an embodiment of the present invention. This cutting element is analogous to grinder element 101 of FIGS. 1 and 2 in the prior art but differs in several unique aspects.

Upper cutting element 401 of FIG. 4 has a body 402 in this embodiment in a cylindrical aspect having an outside diameter D and a height H, with a planar floor 406 having a central small hole 407. The open end of cylindrical body 402 has a flat, horizontal surface 403. A circumferential groove 405 near the open end of the cylinder has two opposite cut-out regions 404a and 404b into the groove. Cut-out 404a is smaller in area than cut-out 404b. Circumferential groove 405 engages projection keys from the outside diameter of a portion of a lower cutting element, as is described in further detail below, enabling the upper and lower cutting elements to be engaged only in a specific rotational aspect before shredding motion begins. A straight knurl pattern is imposed in two places 412 as an aid for a user to grip the cutting elements in a shredding operation.

In this embodiment there are fifteen blades extending from floor 406 into a cavity bounded by the inner wall of the cylinder and the floor. The blades are labeled in FIG. 4 as 408a through 408f, 409a through 409e, and 410a through 410c. Individual ones of the blades are shaped as a flattened, truncated pyramids, as may be seen in FIG. 4, but the blades occupy very specific positions, are oriented differently in specific cases, and vary in height in a specific way, as described more fully below.

Figure 5A:
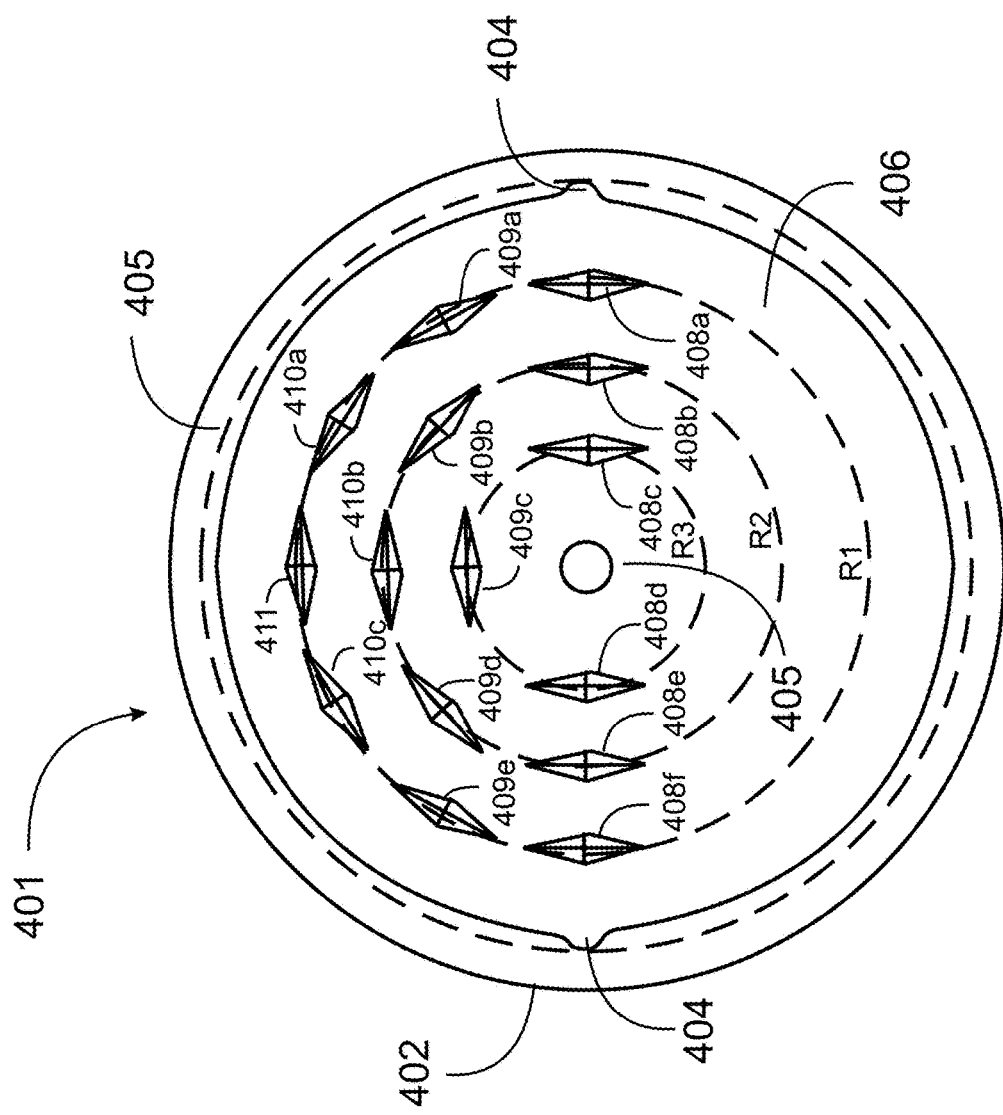
FIG. 5A is a plan view of upper cutting element of FIG. 4.

FIG. 5A is a plan view of upper cutting element 401 of FIG. 4, looking into the open end of the element. The outside and inside concentric diameters of cylindrical body 402 result in a wall thickness, and concentric groove 405 is shown as a hidden line. All fifteen blades are illustrated extending upward from floor 406, labeled with the same element numbers used in FIG. 4.

Blades 408a through 408f, arranged in this example in a row across a diameter of the cutting element, are of a common height. Blades 409a through 409e have a common height greater than the common height of blades 408a through 408f. Blades 410a through 410c have a common height greater than the common height of blades 409a through 409e. The single remaining blade 411 is greater in height than any of the other blades and is therefore the tallest of the fifteen blades in this example.

It may be seen in FIG. 5A that blades 408a, 409a, 410a, 411, 410c, 409e and 408f are arranged sequentially counterclockwise on an outermost radius labeled R1. Blades 409b, 410b, 409d and 408e are arranged sequentially counterclockwise along a smaller radius labeled R2. Finally, blades 408c, 409c and 408d are arranged sequentially counterclockwise along a smallest radius labeled R3.

The height dimensions for the blades and the radial placement, taken together, are seen to provide, along any one of the three radii, that the blades followed either clockwise or counterclockwise, from the first in the sequence in either direction, start with a shortest blade, ascending to a tallest blade, and descending again to a shortest blade.

Further to the above, some of the blades have leading and trailing edges, depending on which way the cutting element may be turned, that are straight cutting edges. Some of the blades, however, have leading and trailing edges that are serrated, as a steak knife, for example, may be serrated. FIG. 5B presents a top view of an example blade 500 with a serrated cutting edge 506. FIG. 5C is a side elevation view of the serrated blade of FIG. 5B. Blade 500 has edges 501, 502, 503 and 504 that intersect with the base plane of the lower cutting element in this case. Edges 508 and 509 are side vertical edges, and edges 506 and 507 are leading or trailing cutting edges, dependent on which way the opposing cutting elements may be turned relative to one another while engaged.

In FIGS. 5B and 5C only one cutting edge, 506, is shown to be serrated, but the skilled person will understand that in alternative embodiments both of the leading/trailing edges may be serrated, and indeed, serration may be only along specific portions of edges.

Referring again to FIG. 5A, the six blades that have serrated leading and/or trailing edges in this particular example are blades 409a, 411 and 409e at radius R1, 408b and 408e at radius R2, and single blade 409c at radius R3. In alternative embodiments of the invention the serration might be on any grouping of blades, and on either or both of the leading or trailing edges. Further, the apparent dimensions of serrations along edge 5606 in FIG. 5C is exemplary only. The serration may have any dimensional parameters that are possible.

Figure 5D:
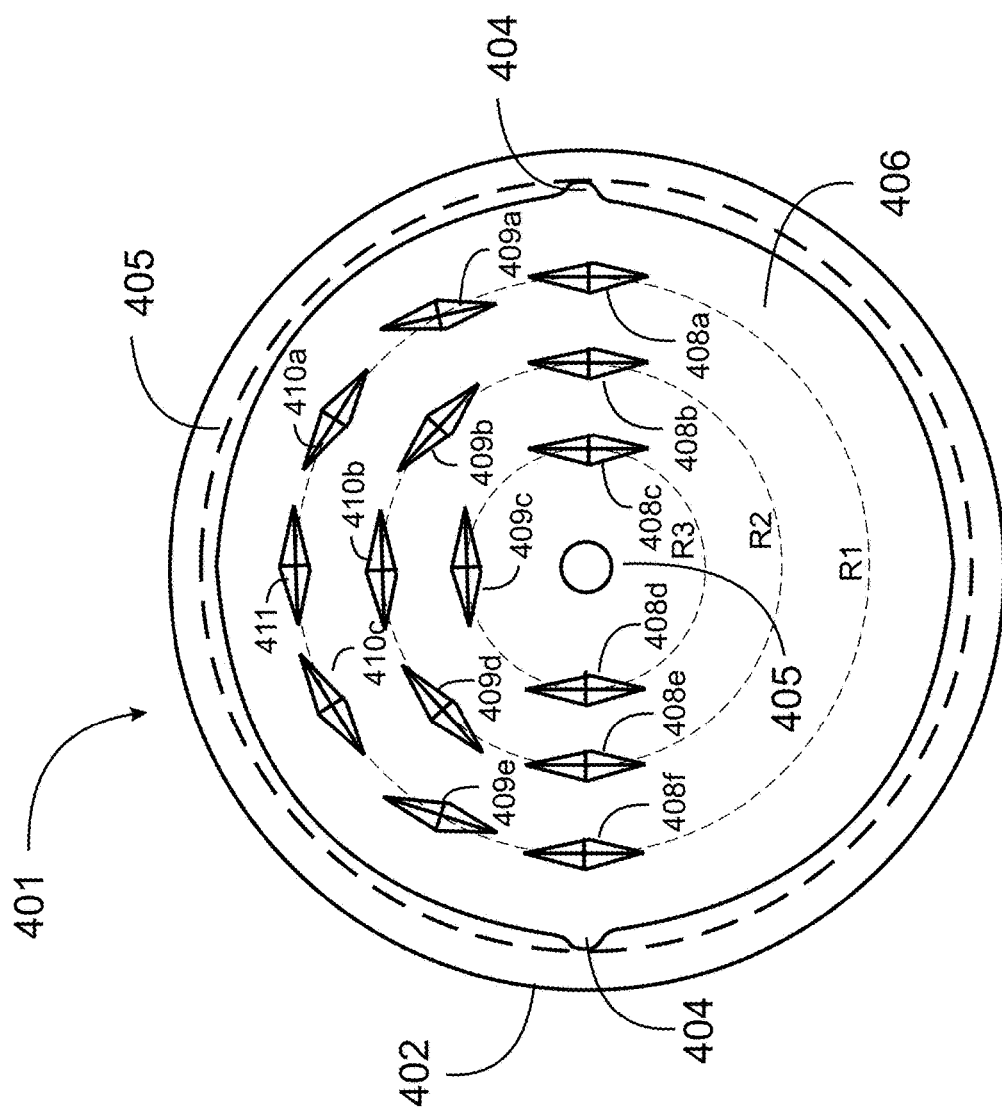
FIG. 5D is a plan view of an upper cutting element illustrating a different blade orientation in an embodiment of the invention.

FIG. 5D is a plan view of a lower cutting element 401 very similar to that of FIG. 5A, illustrating some further detail that may be used in some embodiments. In FIG. 5D the dotted circles at the three radii that define blade locations are shown in a lighter line width, so positions and orientation may be better seen. The blades, such as blades 408a through 408f, for example, are generally seen to be oriented with respect to the radii, such that a line from tip-to-tip for a blade will be tangential to the radius of its location. This orientation effects the direction of the leading cutting edge of a blade when the lower and upper cutting elements are engaged and rotated together. This is not the case in every embodiment, however.

Notice is drawn in FIG. 5D to blades 409a and 409e. These two blades are shown to be centered on radius R1, as are the other blades, but blades 409a and 409e are rotated about their vertical centers such that the leading and trailing edges face in a somewhat different direction than for the other blades. Both may be said to be turned "inward" by perhaps ten degrees each. This change causes the cutting edge in operation to follow a different path than directly behind the blade "in front", depending upon the relative motion between the two engaged cutting elements. In other embodiments other treatments may be employed.

This change is shown in FIG. 5D for just two blades, but in alternative embodiments every blade, or any number of blades, may be rotated thusly, and in different directions and by different angles, depending upon plans and expectations of a designer of different embodiments of the invention.

Figure 6:
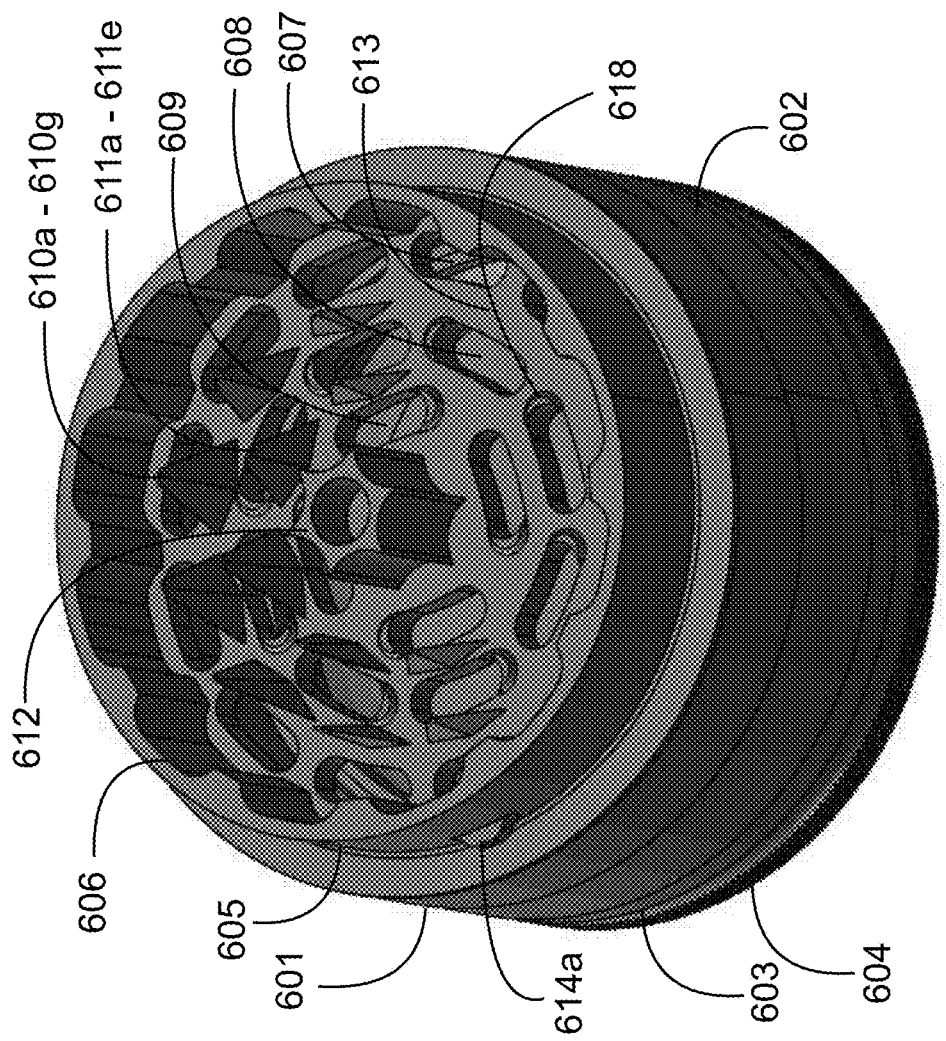
FIG. 6 is a perspective view of a lower cutting element in an embodiment of the invention.

FIG. 6 is a perspective view of a lower cutting element 601 assembled to a catching chamber 602, which is in turn assembled to a lower catching chamber 603 in an embodiment of the present invention. These elements are generally, but not specifically, analogous to the lower cutting element 102, catching chamber 103 and lower catching chamber 104 of FIG. 3, but have many unique features distinguishing patentably over the conventional art.

In FIG. 6 lower cutting element 601 has an upwardly-extending cylindrical portion 605 forming an inner volume having a floor 613. A series of indentions 606 are formed into the wall of cylindrical portion 605 on the inside vertical surface and serve in operation to help stir and blend materials introduced to be shredded, cut with either straight, differing types, or serrated edges of blades.

The outside diameter of cylindrical portion 605 is just slightly less than the inside diameter of the upper cutting element 401 of FIG. 4 and FIG. 5, so the upper cutting element may engage the lower by fitting over the outer diameter of cylindrical portion 605 of the lower cutting element.

An extending key element 614a from the outer diameter of cylindrical portion 605 has a counterpart 614b on the opposite side, not seen in FIG. 6, and these keys serve to limit the rotational orientation of the upper and lower cutting elements in engagement by entering openings 404 that show in FIGS. 4 and 5, to engage inner groove 405. In the act of engaging the upper cutting element to the lower, these keys provide that the engagement may only be accomplished at one specific rotational relationship, about which more is described below.

Floor 613 of the lower cutting element has a plurality of openings 607, 608 and 609, arranged in a specific pattern, described in detail further below. These openings enable cut and shredded material to pass through to catching chamber 602. A plurality of blades 610a through 610g, and 611a through 611e in this example extend upward from floor 613, in a specific pattern described in more detail below. These blades offset radially from the blades of the upper cutting element, so there is no interference in operation, and the passing of blades in each cutting element serves to cut the material introduced. A star-shaped extension 612 projects upwardly from the floor at the center of the lower cutting element. The lower catching chamber 603 at the bottom of the assembly has a knurl pattern 604 enabling a sure grip by a user.

Openings 607, 608 and 609 in this example are curvalinear, having a constant width in the curved direction of a radius and a specific length along the radius, and have half-round ends, as shown. This is exemplary, and not limiting in the scope of embodiments of the invention. Opening of many other shapes might be used.

In one embodiment individual ones of openings 607, 608 and 609 may have an additional detail 618 termed a grating element. These are areas at one, or even both ends of an opening. These grater elements are described and defined more fully below.

Figure 7A:
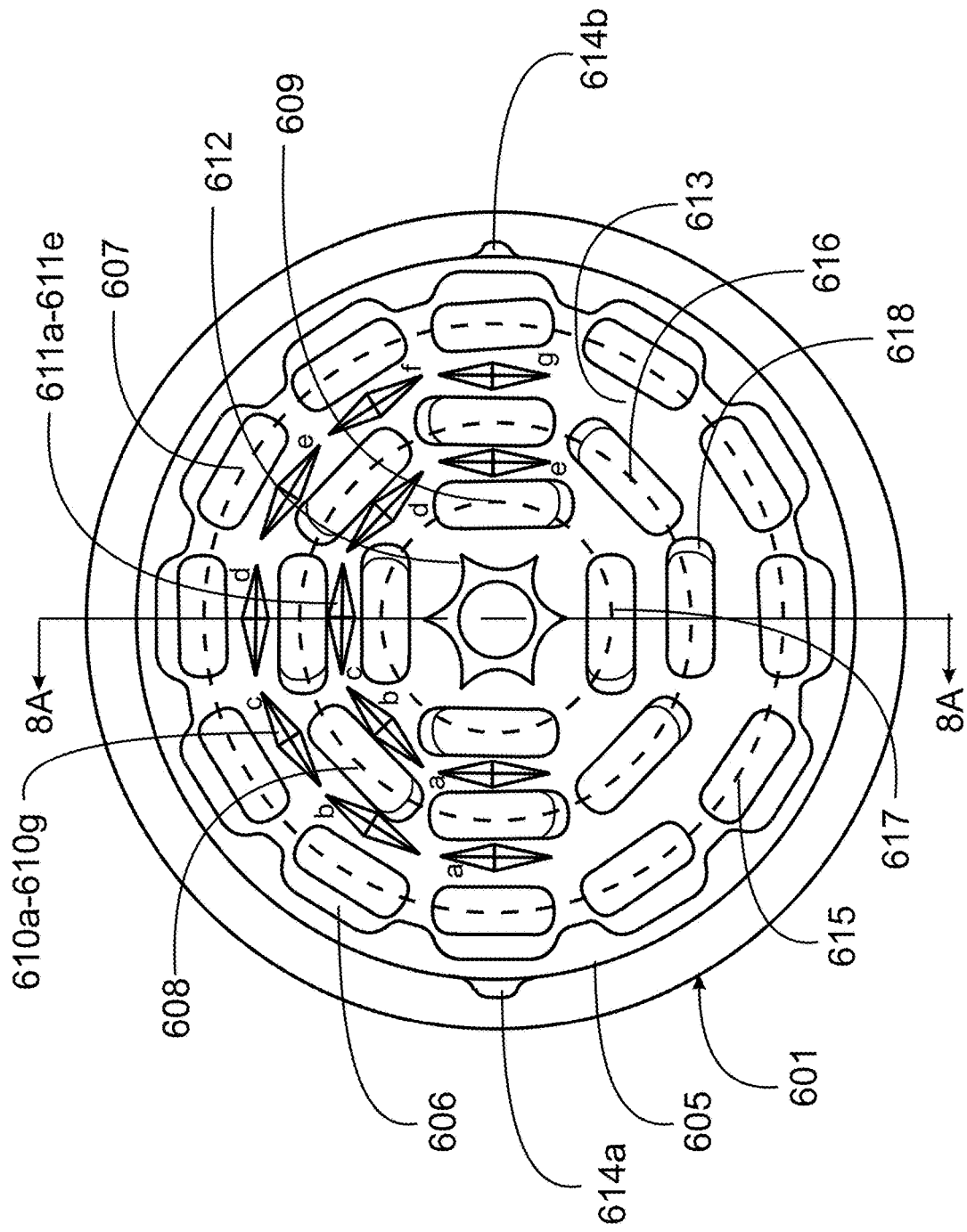
FIG. 7A is a plan view of the lower cutting element of FIG. 7 in an embodiment of the invention.

FIG. 7A is a plan view of lower cutting element 601 enabling clearer detailed description. In this plan view both keys 614a and 614b may be seen on diametrically opposite sides of the outside of cylindrical body 605. Key 614a is longer in arc length than is key 614b. The keys are sized to fit into the cut-outs 404a and 404b of the upper cutting element to engage the keys with circumferential groove 405 of upper cutting element 401. Larger key 614a fits into larger cut-out 404b, and smaller key 614b fits into smaller cut-out 404a. Thusly the upper and lower cutting elements may be initially engaged in one and only one rotational relationship.

Within the internal cavity of lower cutting element 601, bounded by the inner surface of cylinder 605 and floor 613, which has twelve indentions 606 equally spaced around the periphery at thirty-degree intervals, as described above with reference to FIG. 6, there are twelve openings 607 through floor 613 arranged also at thirty-degree intervals in a ring indicated by a dotted circle labeled 615 that places one each of the openings just inside each of indentions 606.

At a smaller radius indicated by dotted circle labeled 616 there are eight openings 608 equally spaced at forty-five degrees. At a yet smaller radius indicated by dotted circle 617 there are four more openings 609 spaced at ninety degrees. All of these openings are sized to enable shredded and cut material to pass through floor 613 into catching chamber 602. Star-shaped element 612 is seen also in the center as shown in FIG. 6.

In this example there are seven blades, individual ones in shape of a flattened, truncated pyramid, as described above, extending upward from floor 613 and spaced at thirty-degree intervals on a radius between the radii of circle 615 and circle 616. There are further five blades of similar shape and size on a radius between circles 616 and 617, at forty-five-degree intervals. The blades 610 are labeled a through g, and the blades 611 are labeled a through e. Blades 610 b, d and f have serrated leading and trailing cutting edges in this example, as was described above for certain blades in the upper shredding element. Blades 611a, c and e also have serrated leading and trailing cutting edges in this example.

Further to the above, as was described with reference to FIGS. 4 and 5 for upper cutting element 401, not all of the blades of the lower cutting element may be of the same height. Referring again to FIG. 7, blades 610a and g, and blades 611a and e, are, in this embodiment, of the same size and height, and are the blades of least height in the lower cutting element. Blades 610b and f, and blades 611b and d, are of incrementally greater height than blades 610a and g, and blades 611a and e. Blades 610c and e, and blade 611c, are of a height incrementally greater than that of blades 610b and f, and blades 611b and d. Blade 610d is incrementally greater in height than blades 610c and e, and blade 611c.

Figure 7B:
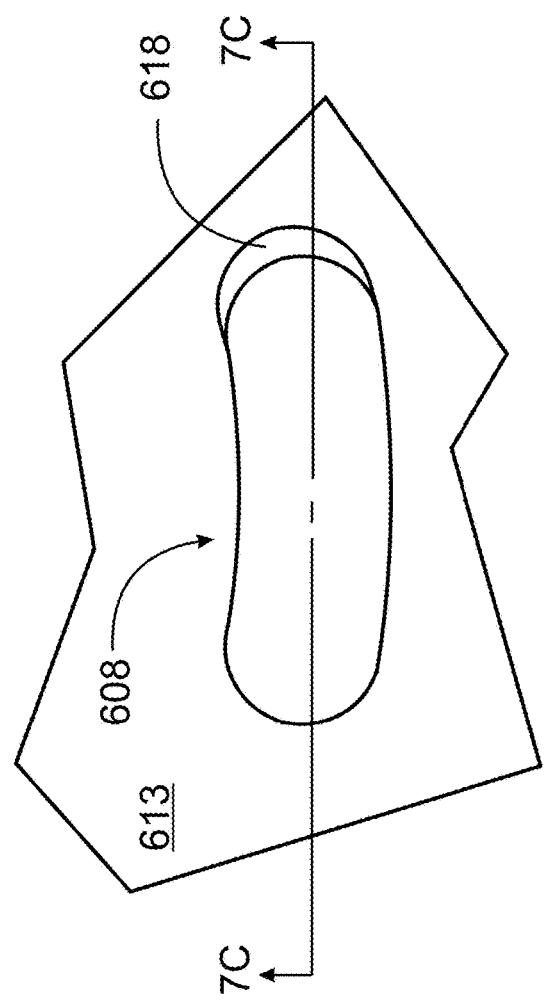
FIG. 7B is a plan view of an opening illustrating a grater element in an embodiment of the invention.
Figure 7C:
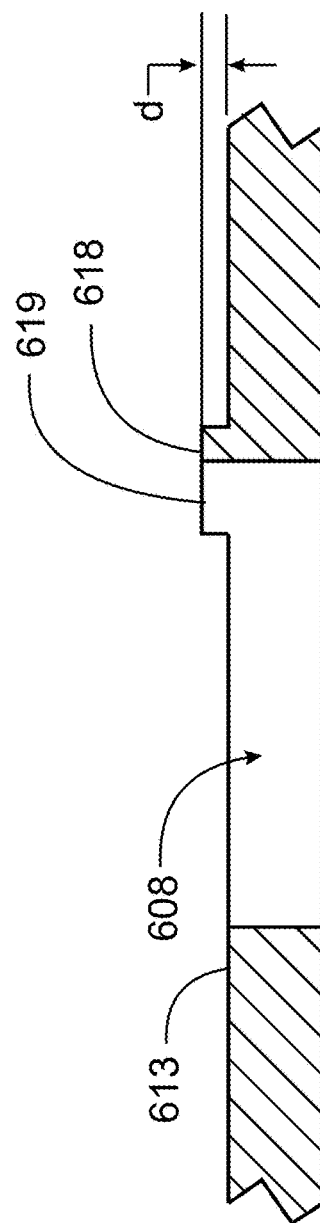
FIG. 7C is a side-elevation section view of the opening of FIG. 7B taken along section line 7C-7C of FIG. 7B.

Referring again to FIG. 7A, a greater element 618 is indicated at one end of each opening 608 through floor 613 arranged along dotted circle 616. A similar grater element 618 is indicated one end of each of openings 609 on dotted circle 609, but at an opposite end to those of openings 608. FIG. 7B is a magnified view of one opening 608 having a grater element 618, and FIG. 7C is a side elevation section view through opening 608 of FIG. 7B, taken along section line 7C-7C of FIG. 7B. Grater element 618 is seen to be, in this example, a planar region raised by a dimension "d" above floor 613. Edge 619 is a machined, sharp edge, so raised greater elements 618 may provide a grating effect on material as the cutting elements are rotated relative to one another.

In some embodiments, grater elements may be implemented on both ends of some openings, and on one end of some openings, and some openings will not have grater elements 618.

FIG. 7D and FIG. 7E illustrate yet another detail that may be implemented in embodiments of the invention. Opening 608 is illustrated in FIGS. 7D and 7E as passing through floor 613 at an angle, rather than vertically. The side walls of opening 608 in this example are vertical, but the walls at the rounded ends are at an angle to vertical. This creates a scooping action as the upper and lower cutting elements are rotated relative to one another, at least in one direction. Again, this feature may be implemented on individual ones of openings in a lower cutting element, and not on all openings.

Referring again to FIGS. 4 and 6 it may be seen that blades extending from the floor of either cutting element are located substantially in a semicircle on one side of the floor of the cutting element, leaving a region in each that is about one-half of the overall area of the floor, that is empty, that is, having no blades. The order of increasing height for the blades in each cutting element follows the position around the radius of each group of blades. The blades next to the clear area, described above as a crush-free zone, are the shortest, the next blades in either rotary direction are of incrementally greater height, and the next higher, and so forth.

Figure 8B:
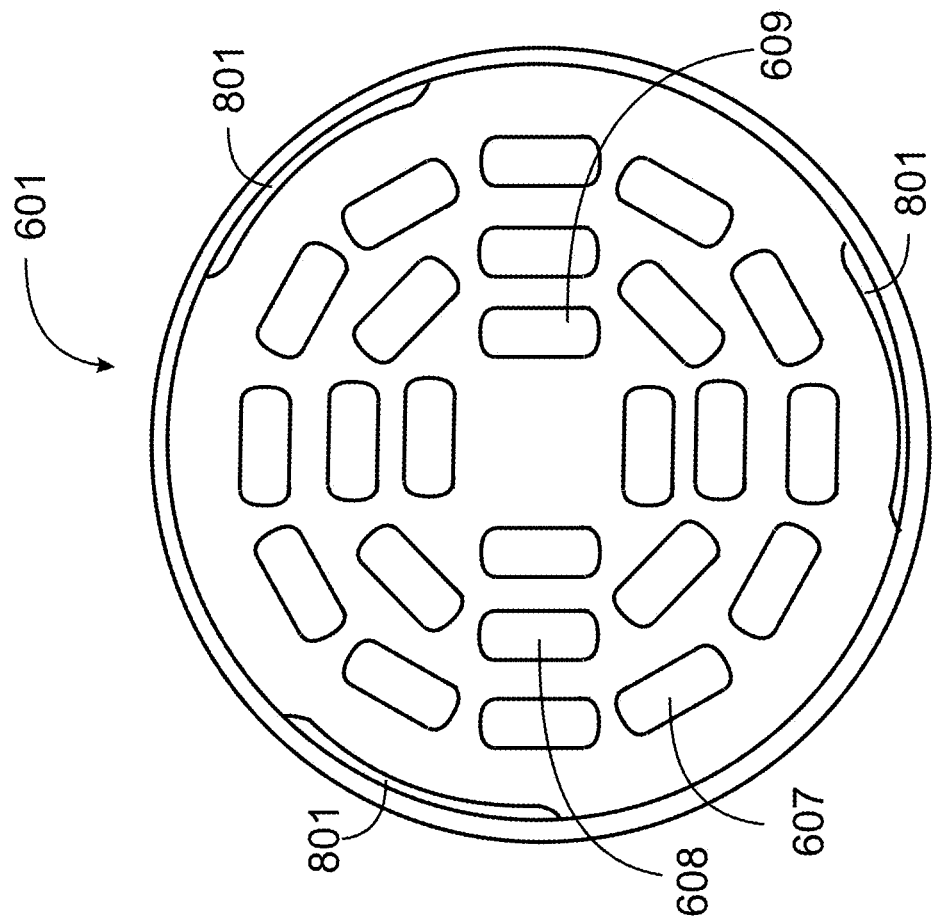
FIG. 8B is a plan view of the lower cutting element of FIG. 7 in a direction opposite to the view of FIG. 7.
Figure 8A:
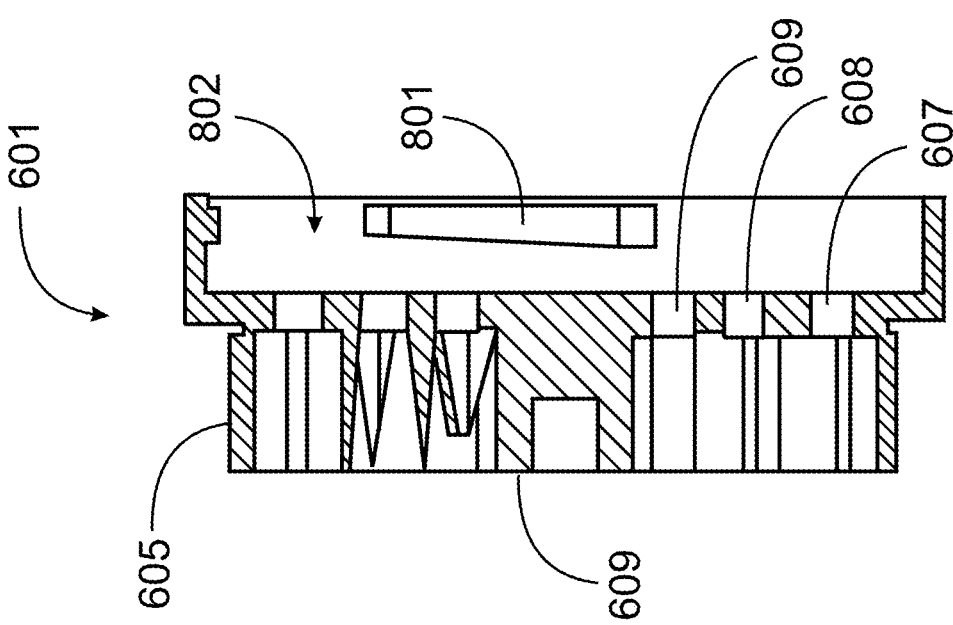
FIG. 8A is a section view of the lower cutting element of FIG. 7A taken along section line 8A-8A in an embodiment of the invention.

FIG. 8A is a section view of lower cutting element 601 taken along section line 8-8 of FIG. 7, and FIG. 8B is a plan view of the lower cutting element in the direction opposite of the plan view of FIG. 7. The detail of FIG. 8 is into the well 802 beneath floor 613. Referring to FIG. 8A, elements 801 are three inclined engagement elements implemented on the inner diameter walls of well 802. These inclined engagement elements are essentially short portions of threads on three places on the inner wall equally spaced at 120 degrees. Similar engagement elements are implemented on outer diameters of catching chamber 602, as is described below, and the engagement elements on the lower cutting element and the catching chamber engage and retain the two parts together. FIG. 9A is an elevation view of capture chamber 602 disengaged from other elements of the herb grinder in one embodiment of the invention. FIG. 9B is a section view of the capture chamber taken along section line 9B-9B. An important and novel aspect of the catching chamber in this embodiment of the invention is that capture chamber 601 has engagement interfaces 901 and 902 having engagement elements 903 in three places around the periphery of each interface, similar to the engagement elements 801 of lower cutting element 601, that are placed and shaped to engage elements 801 of the lower cutting element. The shape and placement is such that catching chamber 602 may be assembled to the lower cutting element with either interface 901 or 902. That is, the catching chamber may be engaged in one orientation, and then may be disengaged and flipped over, and re-engaged. The catching chamber may be assembled with either end up.

In many embodiments catching chamber 601 has a fine-mesh screen (not shown) across the axis of the chamber at the height of shoulder 904. A purpose of this screen is to allow very fine particles, such as pollen, to pass through to a lower collection chamber described below with reference to FIGS. 10A, B and C.

FIG. 10A is a side elevation view of lower catching chamber 603 of FIG. 6, that may be considered a pollen collection chamber. Lower catching chamber 603 has an engagement interface 1001 in the form of a cylindrical body, and a finely knurled region 102 enabling a secure grip for a user in operation.

FIG. 10B is a plan view into the engagement cylinder 1001 of the lower catching chamber illustrating a floor 1004 and three engagement elements 1003 positioned around an inner diameter wall of body 1001. Engagement elements 1003 are inclined planes similar to engagement elements 903 described above with reference to FIGS. 9A and 9B. When catching chamber 602 is engaged to the lower cutting element 601 by virtue of engagement of interface 901 and engagement elements 903 with engagement elements 801 of the lower cutting element, lower catching chamber may be engaged to the catching chamber by engagement elements 1003 engaging with engagement elements 903 of interface 902. As described above, however, catching chamber 602 may be reversed, so interface 901 is below, and the lower catching chamber may still be engaged to the lower catching chamber. The reversibility of catching chamber 602 is a unique aspect of an herb grinder in an embodiment of the present invention.

A Crush-Free Zone

The inventor in the instant case is aware of a problem common to just about every herb grinder apparatus in the conventional art. The arrangement of the teeth and the means by which the grinder or cutting elements engage requires that material to be ground be placed into, typically, the lower grinder element onto the upwardly-extending teeth. Then a user must engage the upper grinder element to the lower grinder element. The material to be shredded is necessarily, in just about all cases, of a volume more extensive than any space between teeth of the grinder elements. Therefore, the user must place the material onto the teeth, and smash the material down between the teeth. Then the upper grinder element is engaged, which further crushes the material before any shredding action begins. This crushing is not desirable. A loading process that avoids completely any crushing effect would generally produce a superior ground product.

Referring again to FIGS. 4 and 5, it is seen that, in some embodiments of the invention, in upper cutting element 401 all of the blades are in one semi-circle of floor 406, and the other semicircle has no blades. Similarly, referring to FIGS. 6 and 7 the same is true. All blades are limited to one half of the floor, in one semi-circle. Further, inner groove 405 with entry openings 404a and 404b, having different size, and projections 614a and 614b on body 605 of lower cutting element 601, ensure that the upper and lower cutting elements can only be initially engaged with regions without blades of the two cutting elements facing one another. This unique arrangement enables a user, with the upper cutting element removed, to place material to be processed into the lower cutting element in the region without blades. There is no crushing effect in this loading operation. Then, the upper cutting element may be engaged to the lower, but groove 405 and the openings and the key elements 614a and 614b ensure that the blade-free region of the upper cutting element will match with the blade-free region of the lower cutting element as the two cutting elements are engaged, so there will be no crushing effect in the engagement step as well.

In some embodiments, to further enhance the crush-free zone, the depth of the upper and lower cutting elements may be increased beyond the depth of such elements in the conventional art. In the prior art this depth is typically on the order of twelve to thirteen mm. In one embodiment of the instant invention this depth may be as much as 24 mm or greater. In various embodiments that have such additional depth, for the purpose of avoiding inadvertent crushing of product, the height of blades may be adjusted as well.

The skilled person will understand that embodiments of the present invention described herein are exemplary only, and that there will be many alterations that may be made within the scope of the invention. Limitations to the invention are set only in the claims below.

I claim:

1. A herb processor, comprising:
an upper cutting element having a descending cylindrical body having a central axis, an outer and an inner diameter, a planar lower end, blades extending downward from an upper base disk in a first pattern, and a region of a specific geometry devoid of blades;
a lower cutting element having an ascending cylindrical body having a central axis, an outer and an inner diameter, blades extending upward from a lower base disk in a second pattern, a region of specific geometry devoid of blades, openings through the lower base disk in a third pattern, and a lower engagement interface of an outer diameter greater than the outer diameter of the ascending cylindrical body, presenting a planar shoulder at a lower end of the ascending cylindrical body; and
a cylindrical collection chamber having a lower closed end and an upper engagement interface;
wherein the blades of each of the upper and the lower cutting elements are shaped as flattened, truncated pyramids extending from the base of the pyramid, each blade positioned along a radius of the disk from which it extends, presenting a leading and a trailing cutting edge, the blades are positioned in each of the upper and the lower cutting elements along semicircular arcs beginning and ending at a specific diameter line dividing the base disks of the upper and lower cutting elements into two semicircular portions, one with blades and the other without blades, and wherein the upper cutting element engages the lower cutting element with the inner diameter of the upper cutting element fitting over the outer diameter of the ascending cylindrical body of the lower cutting element, with the planar lower end of the upper cutting element meeting the planar shoulder at the lower end of the ascending cylindrical body, wherein the cylindrical collection chamber assembles to the lower cutting element by the upper engagement interface, engaging the lower engagement interface of the lower cutting element, and wherein the first and second pattern of blades are adapted to enable blades of the upper cutting element to pass blades of the lower cutting element as the upper and lower cutting elements are rotated relative to one another, without interference.

2. The herb processor of claim 1 wherein the upper cutting element has seven blades equally spaced along a first outer semicircular arc at a first radius, five blades equally spaced along a second intermediate semicircular arc at a second radius smaller than the first radius, and three blades equally spaced along a third semicircular arc at a third radius smaller than the second radius.

3. The herb processor of claim 1 wherein the lower cutting element has seven blades equally spaced along a semicircular arc at a fourth radius smaller than the first radius but greater than the second radius, and five blades equally spaced along a semicircular arc at a fifth radius smaller than the second radius by greater than the third radius.

4. The herb processor of claim 3 wherein the pattern of opening through the lower base disk comprises openings equally spaced in a circular pattern having a sixth radius greater than the fourth radius, openings equally spaced in a circular pattern at a seventh radius smaller than the fourth radius but greater than the fifth radius, and openings at an eighth radius smaller than the fifth radius.

5. The herb processor of claim 4 wherein the openings through the lower base disk are arcuate openings having rounded ends and a width in the radial direction less than the difference between blades at the fourth radius and blades at the fifth radius.

6. The herb processor of claim 5 wherein individual ones of openings through the lower base disk have grater details at one or both ends of the opening, comprising regions adjacent edges of the opening at the ends, and raised above the floor, having sharp, machined edges.

7. The herb processor of claim 1 comprising a positioning mechanism restricting initial engagement of the upper and the lower cutting elements to a rotational relationship whereby the regions devoid of blades in the upper and lower cutting elements must be overlaid to engage the cutting elements.

8. The herb processor of claim 7 wherein the positioning mechanism comprises a circumferential groove on the inside diameter of the upper cutting element near the planar lower end of the descending cylindrical body, with diametrically opposed openings into the groove from the planar lower end, and extended key elements on the outside diameter of the ascending cylindrical body near the planar shoulder at the lower end, whereby the extended key elements engage and enter the openings into the circumferential groove, positioning the regions devoid of blades proximate at assembly, providing a crush-free zone for loading material.

9. The herb processor of claim 8 wherein height of the ascending and descending cylindrical bodies with the cutting elements fully engaged provides an enclosed volume of a diameter and a height is at least 24 mm.

* * * * *